United States Patent
Jungert et al.

(10) Patent No.: US 9,073,461 B2
(45) Date of Patent: Jul. 7, 2015

(54) MOTOR VEHICLE SEAT

(71) Applicant: Dr. Ing. h.c.F. Porsche Aktiengesellschaft, Stuttgart (DE)

(72) Inventors: Dieter Jungert, Weissach (DE); Joachim Mueller, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 10 days.

(21) Appl. No.: 13/714,898

(22) Filed: Dec. 14, 2012

(65) Prior Publication Data

US 2013/0154317 A1   Jun. 20, 2013

(30) Foreign Application Priority Data

Dec. 14, 2011   (DE) .................. 10 2011 056 430

(51) Int. Cl.
- *B60N 2/42* (2006.01)
- *B60N 2/68* (2006.01)

(52) U.S. Cl.
CPC . *B60N 2/42* (2013.01); *B60N 2/682* (2013.01)

(58) Field of Classification Search
CPC .................................. B60N 2/42; B60N 2/682
USPC .................. 297/440.15, 440.2, 354.1, 463.1, 297/440.16, 440.21
See application file for complete search history.

(56) References Cited

U.S. PATENT DOCUMENTS

| | | | |
|---|---|---|---|
| 4,890,888 A | 1/1990 | Kostin | |
| 4,919,486 A | 4/1990 | Chinomi et al. | |
| 5,100,204 A * | 3/1992 | Makihara et al. | 297/452.65 |
| 5,193,881 A * | 3/1993 | Minai | 297/452.18 |
| 5,468,048 A * | 11/1995 | Clemens et al. | 297/284.4 |
| 5,848,824 A * | 12/1998 | Mocur | 297/440.2 |
| 6,033,017 A * | 3/2000 | Elqadah et al. | 297/216.1 |
| 6,491,346 B1 * | 12/2002 | Gupta et al. | 297/452.65 |
| 6,536,791 B1 * | 3/2003 | Adams | 280/250.1 |
| 7,604,298 B2 * | 10/2009 | Peterson et al. | 297/440.2 |
| 7,832,806 B2 | 11/2010 | Yamada | |
| 2007/0057556 A1 * | 3/2007 | Kang | 297/354.1 |
| 2013/0009444 A1 * | 1/2013 | Wilson et al. | 297/463.1 |
| 2013/0119735 A1 * | 5/2013 | Thurow | 297/354.1 |

FOREIGN PATENT DOCUMENTS

| | | |
|---|---|---|
| DE | 848 402 | 9/1952 |
| DE | 39 15 917 | 4/1990 |
| DE | 42 38 549 | 5/1994 |
| DE | 296 04 629 | 8/1996 |
| DE | 10 2008 059 016 | 4/2010 |
| DE | 20 2010 014 730 | 1/2011 |

(Continued)

OTHER PUBLICATIONS

German Search Report of Jul. 20, 2012.

*Primary Examiner* — David R Dunn
*Assistant Examiner* — Jody Giacoman
(74) *Attorney, Agent, or Firm* — Gerald E. Hespos; Michael J. Porco; Matthew T. Hespos

(57) ABSTRACT

A motor vehicle seat has a seat frame and a backrest frame that is connected pivotably to the seat frame at the sides via fittings. The fittings are screwed to the backrest frame. A screwing direction of at least one screw runs in the longitudinal direction of the vehicle. A significantly improved force flux in the event of a rear or front impact of the motor vehicle can thereby be achieved.

10 Claims, 3 Drawing Sheets

(56) References Cited

FOREIGN PATENT DOCUMENTS

| | | |
|---|---|---|
| DE | 10 2010 020 225 | 11/2011 |
| EP | 0 359 406 | 3/1990 |
| JP | 2001-271814 | 10/2001 |

\* cited by examiner

MOTOR VEHICLE SEAT

CROSS REFERENCE TO RELATED APPLICATION

This application claims priority under 35 USC 119 to German Patent Appl. No. 10 2011 056 430.6 filed on Dec. 14, 2011, the entire disclosure of which is incorporated herein by reference.

BACKGROUND OF THE INVENTION

1. Field of the Invention

The invention relates to a motor vehicle seat that has a seat frame and a backrest frame that is connected pivotably to the seat frame at the sides via fittings. The invention also relates to a motor vehicle equipped with at least one motor vehicle seat of this type.

2. Description of the Related Art

DE 42 38 549 C2 discloses a motor vehicle seat with a seat frame and a backrest frame that is deformable in the event of a crash. The backrest frame has two profiled backrest side parts that run substantially parallel to each other and are connected by at least one upper crossmember. Fittings connect the backrest frame pivotably to the seat frame. The wall thickness of the backrest frame is thin so that high deformation energy can be absorbed by the seat frame in the event of a crash. The backrest frame is cast integrally with supporting bows arranged on the backrest side parts so that the backrest frame can be as structurally simple and cost-effective as possible.

DE 39 15 917 A1 discloses a motor vehicle seat with a rectangular backrest frame, a side panel fastened to a lower section on one side of the backrest frame, an adjustment mechanism with a pivoting arm, two sets of screws and nuts for releasable connection of the side panel and the pivoting arm, a hook determined either by the side panel or the pivoting arm, and a locking device. The hook can be brought into engagement with the locking device in a lockable manner and so as to be releasable if the side panel is fastened to the pivoting arm by screws and nuts.

U.S. Pat. No. 7,832,806, JP 2001-271814 A and EP 0 359 406 B1 all disclose motor vehicle seats similar to those described above.

A common feature of all of the motor vehicle seats described above is that a backrest frame is screwed to lateral fittings that are fastened in an articulated manner to the seat frame of the motor vehicle seat. However, the known motor vehicle seats have an extremely unfavorable torsional loading in the event of a crash, and lever forces, which are not to be underestimated, act on the screw connection.

The invention provides a motor vehicle seat with an improved crash performance.

SUMMARY OF THE INVENTION

The invention relates to a motor vehicle seat where a screwing-in direction of screws that fasten a backrest frame to lateral fittings is rotated by 90° so that the screwing-in direction of the screws, i.e. the longitudinal axis thereof, runs in the longitudinal direction of the vehicle. As a result, the screws are not subjected to torsional loads in the event of a crash, but rather are subjected exclusively to transverse forces. The screws are designed and dimensioned to absorb these forces more effectively. The motor vehicle seat of the invention has a seat frame and a backrest frame that is connected pivotably to the seat frame at the sides via fittings. The fittings are screwed to the backrest frame by screws by screws with a screwing direction that runs in the longitudinal direction of the vehicle. Thus, in the event of a crash, such as a rear impact, the screws are not subjected to a torque having a lever arm, but rather merely are subjected to a transverse load via the respective tension and compression straps of the backrest frame.

At least one of the fittings may have a U-shape with two U limbs bordering, enclosing or surrounding the backrest frame. The U limbs run parallel to the transverse direction of the vehicle. At least one screw running parallel to the longitudinal direction of the vehicle is guided through each U limb and is screwed to the backrest frame. The fittings or an upper part of the fitting that faces the backrest frame can be comparatively stiff per se and, by surrounding the backrest frame, can be connected in a particularly stiff manner to the backrest frame.

The backrest frame preferably has tension and compression straps, and the fittings preferably are screwed directly to the tension and compression strap. The direct screwing of the fittings to the tension and compression straps of the backrest frame enable a particularly favorable force flux to be achieved in the event of a rear impact. The tension and compression straps also preferably are designed to be particularly stiff and to absorb large loads. The tension and compression straps customarily run on a front and rear side of the backrest frame and are formed by reinforced regions.

The backrest frame may be formed from light metal and preferably cast magnesium. Magnesium is lighter than aluminum by approximately 30%, but a significantly increased strength can be achieved by the addition of corresponding alloy elements. Magnesium alloys have particularly good casting properties and permit the production of complicated die cast shapes with high surface quality. Magnesium also does not have such a corrosive effect on the steel crucibles and molds, as, for example, an aluminum melt, and the die cast operation can be carried out with smaller draft angles.

Further important features and advantages of the invention emerge from the drawings and from the associated description of the figures with reference to the drawings.

The features mentioned above and those explained below can be used in the stated combination and in other combinations or on their own without departing from the scope of the invention.

Preferred embodiments of the invention are illustrated in the drawings and are explained in more detail in the description below, wherein the same reference numbers refer to identical or similar or functionally identical components.

DETAILED DESCRIPTION OF THE PREFERRED EMBODIMENTS

Figure 1:
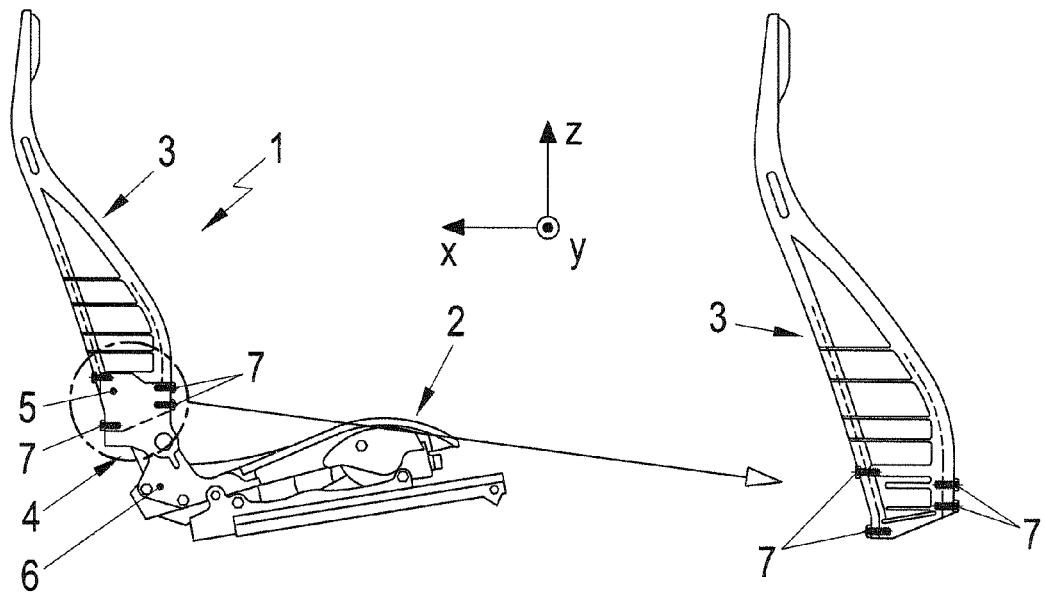
FIG. 1 is a side view of a motor vehicle seat according to the invention and a detailed illustration to clarify a screwing(-in) direction of screws holding a backrest frame.
Figure 2:
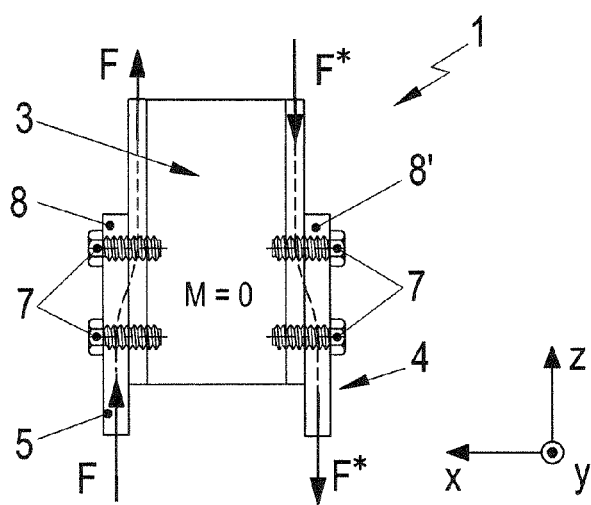
FIG. 2 shows the screw connection for holding the backrest frame.
Figure 3:
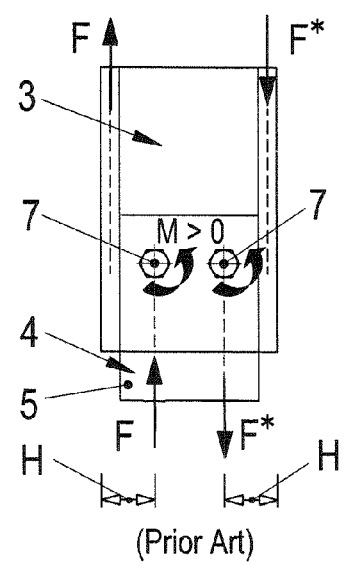
FIG. 3 shows a prior art screw connection for holding the backrest frame.
Figure 4:
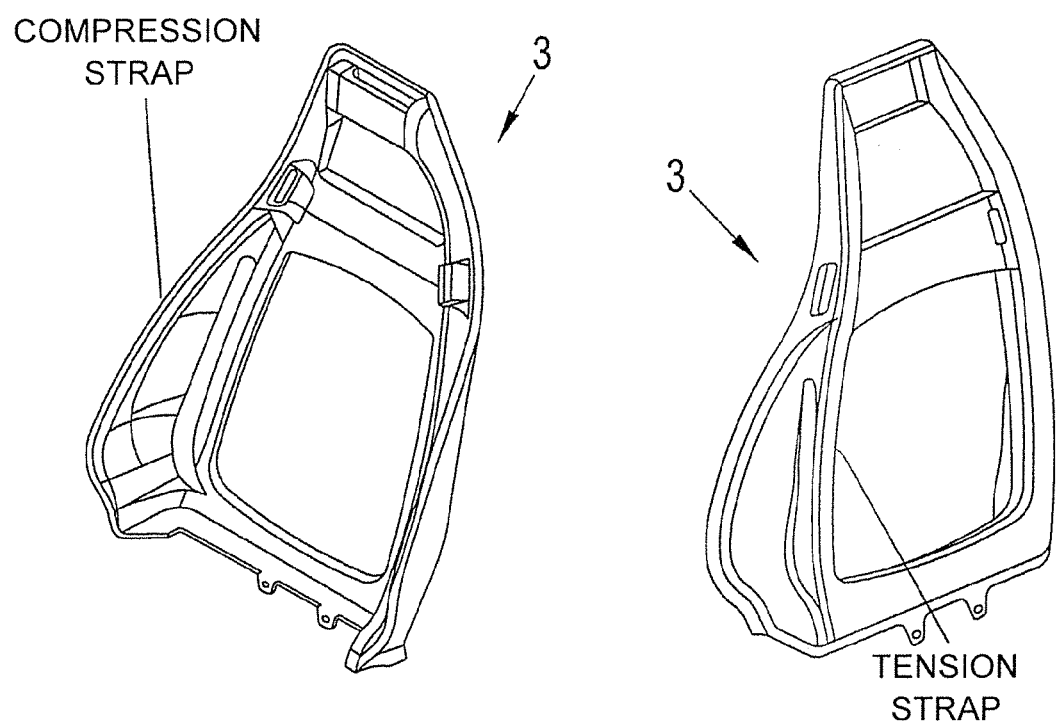
FIG. 4 shows different views of a backrest frame of the invention.
Figure 5:
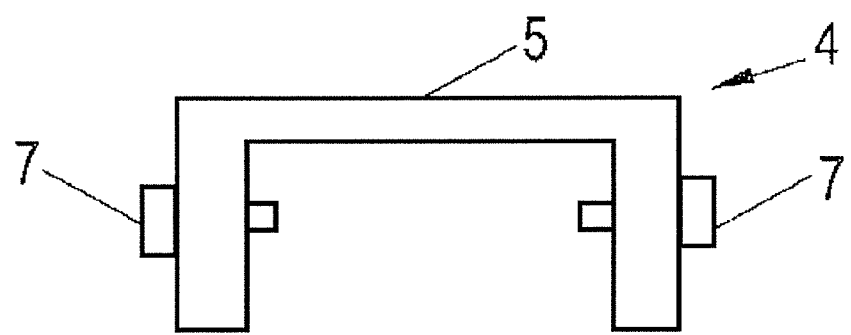
FIG. 5 is a plan view of a fitting of the invention.

A motor vehicle seat 1 for a motor vehicle 10 according to the invention has a seat frame 2 and a backrest frame 3, as shown in FIG. 1. The backrest frame 3 is connected to sides of the seat frame 2 via fittings 4, 4' as shown in FIGS. 1 and 2. Each of the fittings 4, 4' has an upper part 5 facing the backrest frame 3 and a lower part 6 facing the seat frame 2, and the two parts 5, 6 of the fitting 4, 4' are mounted pivotably on each other to permit pivoting of the backrest frame 3 relative to the seat frame 2. The upper part 5 of the fittings 4, 4', and therefore the fitting 4, 4' itself, is screwed to the backrest frame 3, and a screwing-in direction of at least one screw 7, i.e. a longitudinal axis of the screw 7, runs in the longitudinal direction X of the vehicle. This alignment achieves particularly good holding of the backrest frame 3 in the event of a crash, particularly for impact forces in the longitudinal direction X of the vehicle. Reference is made to FIGS. 2 and 3 to clarify the force profile improved by the screws 7 arranged according to the invention.

FIG. 3 shows a prior art screw connection of the upper part 5 of the fitting 4 to the backrest frame 3 with the screws 7 screwed-in parallel to the transverse direction Y of the vehicle. In the event of a rear impact, a pressure strap therefore runs on a front side of the backrest frame 3 whereas a corresponding tension strap runs on the rear side of the backrest frame 3. Accordingly, compressive forces F* are conducted on the front side of the backrest frame 3 as far as the screws 7, whereas tensile forces F are conducted on the rear side of the backrest frame 3 to the associated screw 7. The individual forces F* and F do not now run through the axes of the screws 7. As a result, a lever arm H arises, and moments M due to the crash loading are introduced into the screws 7. In this case, the forces F* and F run in a pressure strap or tension strap of the backrest frame 3.

In contrast, the screws 7 of the invention run in the longitudinal direction X of the vehicle, as illustrated in FIG. 2, and there are considerable advantages with respect to the force flux achieved by the screws 7. More particularly, in the event of a rear impact, the forces F* and F run directly through the screw axes of the screws 7. Therefore, the screws do not absorb a torque or a torsional load.

At least one of the fittings 4, 4' has a U-shaped design with two U limbs 8, 8' bordering (enclosing) the backrest frame 3. The U limbs 8, 8' run parallel to the transverse direction Y of the vehicle and two screws 7 running parallel to the longitudinal direction X of the vehicle are guided through each U limb 8, 8' and screwed to the backrest frame 3. A screw connection is provided with four screws 7 for a stiff connection of the backrest frame 3 to the upper part 5 of the respective fitting 4. The backrest frame 3 preferably is formed, for example, from light metal, in particular from cast magnesium, or may be a shaped sheet metal part.

Of course, a padding (not shown) with a corresponding cover is arranged on both the seat frame 2 and on the backrest frame 3.

The screw connection running in the longitudinal direction X of the vehicle, a significantly improves force absorption and the introduction of forces from the backrest frame 3 into the respective fitting 4, 4'. The screws 7 no longer have to endure a torsional load, but rather only a transverse load, that is to say, the screws 7 are now only stressed by shearing forces. Thus, the screws 7 can be smaller and reduced in weight.

What is claimed is:

1. A motor vehicle seat comprising:
a backrest frame having opposite top and bottom ends, a rear support and left and right side supports projecting forward from the rear support, each of the side supports having a compression strap and a tension strap disposed respectively at opposite front and rear ends of the respective side support and spaced apart along a longitudinal direction of the vehicle, the compression strap and the tension strap extending from the bottom end of the backrest frame toward the top end thereof;

fittings having a U-shaped upper part with a connecting portion and front and rear limbs extending from the connecting portion in a direction substantially transverse to the longitudinal direction, the front and rear limbs respectively engaging a front surface of the compression strap and a rear surface of the tension strap of one of the side supports of the backrest frame, each of the fittings further having a lower part pivotably connected to the upper part at a pivot location substantially aligned with the compression strap and the front limb;

front screws having axial directions aligned in the longitudinal direction, the front screws passing through the front limb and screwed into the front surface of one of the compression straps of the backrest frame and rear screws having axial directions aligned in the longitudinal direction, the rear screws passing through the rear limb and screwed into the rear surface of the tension strap of the respective side support of the backrest frame at positions so that the rear screws are offset in a bottom to top direction from the front screws; and a seat frame connected to the lower part of the fittings so that the backrest frame can pivot with the upper part of the fitting relative to the lower part of the fitting and relative to the seat frame.

2. The motor vehicle seat of claim 1, wherein the backrest frame is formed from cast magnesium.

3. The motor vehicle seat of claim 1, wherein the backrest frame is a shaped sheet metal part.

4. The motor vehicle seat of claim 1, wherein the rear screws comprise upper and lower rear screws, a distance from the bottom end of the backrest frame to the lower rear screw being less than a distance from the bottom end of the backrest frame to any of the front screws.

5. The motor vehicle seat of claim 4, wherein a distance from the bottom end of the backrest frame to the upper rear screw is greater than a distance from the bottom end of the backrest frame to any of the front screws.

6. A motor vehicle with opposite front and rear ends spaced apart along a longitudinal direction, the motor vehicle comprising:
at least one motor vehicle seat having a backrest frame with opposite top and bottom ends, a rear support and left and right side supports projecting forward from the rear support, each of the side supports having a compression strap and a tension strap disposed respectively at opposite front and rear ends of the side support and spaced apart along the longitudinal direction of the vehicle, the compression strap and the tension strap extending from the bottom end of the backrest frame toward the top end thereof;

fittings having a U-shaped upper part with a connecting portion and front and rear limbs extending from the connecting portion in a direction substantially transverse to the longitudinal direction, the front and rear limbs respectively engaging a front surface of the compression strap and a rear surfaces of the tension strap of the respective side support of the backrest frame and a lower part pivotably connected to the upper part at a pivot location substantially aligned with the compression strap and the front limb;

front screws having axial directions aligned in the longitudinal direction, the front screws passing through the front limb and screwed into the front surface of the compression strap of the respective side support of the backrest frame and rear screws having axial directions aligned in the longitudinal direction passing through the rear limb and screwed into the rear surface of the tension strap of the respective side support of the backrest frame at positions so that the rear screws are offset in a bottom to top direction from the front screws; and a seat frame connected to the lower part of the fittings so that the backrest frame can pivot with the upper part of the fitting relative to the lower part of the fitting and relative to the seat frame.

7. The motor vehicle of claim 6, wherein the backrest frame is formed from cast magnesium.

8. The motor vehicle of claim 6, wherein the backrest frame is a shaped sheet metal part.

9. The motor vehicle of claim 6, wherein the rear screws comprise upper and lower rear screws, a distance from the bottom end of the backrest frame to the lower rear screw being less than a distance from the bottom end of the backrest frame to any of the front screws.

10. The motor vehicle of claim 9, wherein a distance from the bottom end of the backrest frame to the upper rear screw is greater than a distance from the bottom end of the backrest frame to any of the front screws.

\* \* \* \* \*